(12) United States Patent
Liu

(10) Patent No.: US 8,151,285 B2
(45) Date of Patent: Apr. 3, 2012

(54) OPTICAL DISK DRIVE WITH PROTECTIVE STRUCTURE

(75) Inventor: Zhi-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 321 days.

(21) Appl. No.: 12/548,664

(22) Filed: Aug. 27, 2009

(65) Prior Publication Data

US 2011/0010729 A1 Jan. 13, 2011

(30) Foreign Application Priority Data

Jul. 7, 2009 (CN) .......................... 2009 1 0304082

(51) Int. Cl.
*G11B 33/02* (2006.01)

(52) U.S. Cl. ........................................................ 720/646

(58) Field of Classification Search .................. 720/646, 720/647, 655
See application file for complete search history.

(56) References Cited

U.S. PATENT DOCUMENTS

| 5,648,882 | A | * | 7/1997 | Tangi et al. ................. | 360/99.06 |
| 5,701,216 | A | * | 12/1997 | Yamamoto et al. ........ | 360/99.02 |
| 6,363,045 | B2 | * | 3/2002 | Sato ............................. | 720/647 |
| 6,411,583 | B1 | * | 6/2002 | Yamamoto et al. ........... | 720/647 |
| 6,556,529 | B1 | * | 4/2003 | Onishi et al. .................. | 720/619 |
| 6,910,217 | B2 | * | 6/2005 | Kan-o ........................... | 720/646 |
| 7,490,337 | B2 | * | 2/2009 | Lee .............................. | 720/647 |
| 7,827,568 | B1 | * | 11/2010 | Banko ........................... | 720/619 |
| 2004/0001416 | A1 | * | 1/2004 | Suzuki et al. ................. | 369/75.1 |
| 2005/0223398 | A1 | * | 10/2005 | Fujimura et al. ............. | 720/601 |
| 2005/0223399 | A1 | * | 10/2005 | Suzuki .......................... | 720/647 |

* cited by examiner

*Primary Examiner* — Brian Miller

(74) *Attorney, Agent, or Firm* — Altis Law Group, Inc.

(57) ABSTRACT

An optical disk drive includes a cassette mechanism and a protective structure. The protective structure includes a protective member. The protective member includes a protective portion with a passage that can deform to increase the width of the passage when an optical disk enters the passage, and returning to the original width of the passage when the optical disk has passed through the passage.

11 Claims, 3 Drawing Sheets

OPTICAL DISK DRIVE WITH PROTECTIVE STRUCTURE

BACKGROUND

1. Technical Field

The present disclosure generally relates to optical disk drives, and particularly, to a slot-in optical disk drive with protective structure.

2. Description of Related Art

Slot-in optical disk drives are currently widely used. A typical slot-in optical disk drive includes a housing and a cassette mechanism. The housing and the cassette mechanism cooperatively define an access slot. In use, an optical disk is received in the cassette mechanism via the access slot of the housing and the cassette mechanism.

The width of the access slot cannot be less than the thickness of the optical disk. However, it must not be large enough such that dust or other contaminants can enter into the inner cassette mechanism of the optical disk drive via the access slot, especially when the disk is in use. Such contaminants can severely damage the laser probes of the drive. Thus, the operational life of the optical disk drive is shortened.

Therefore, an optical disk drive is desirable that overcomes the described limitations.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
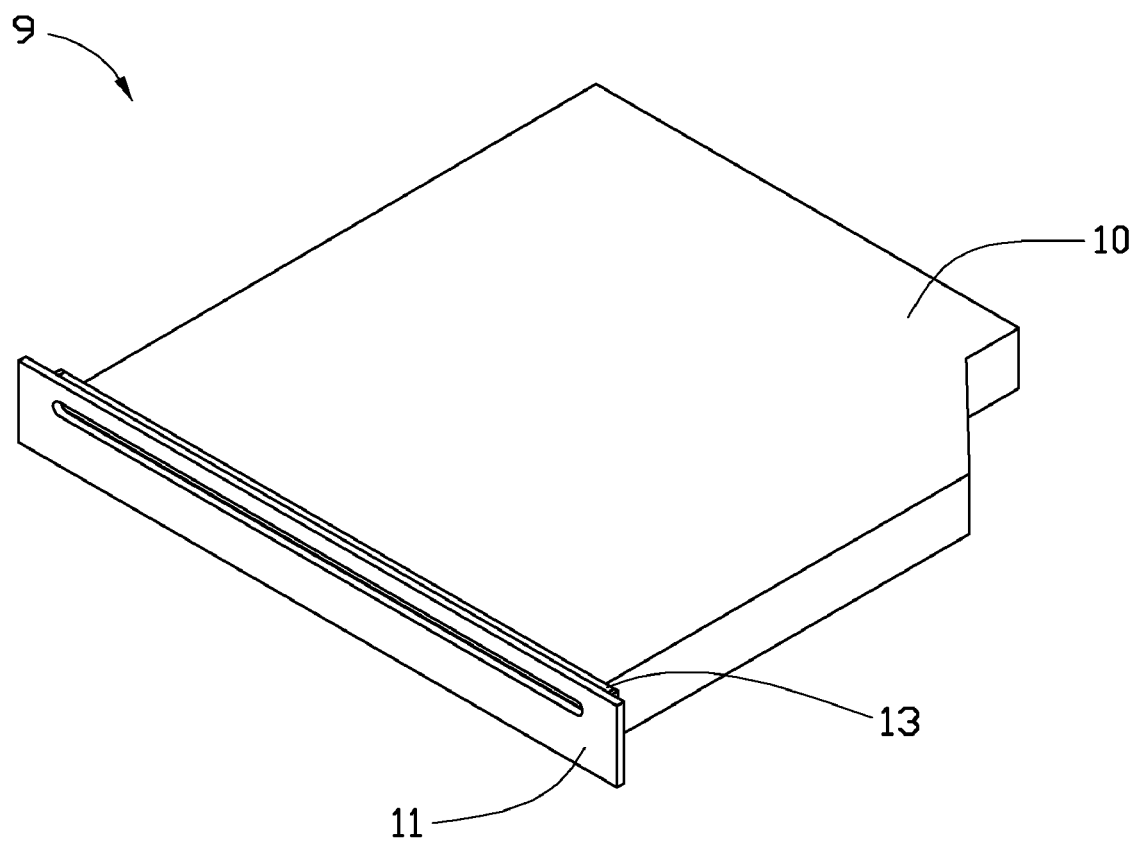
FIG. 1 is an isometric, assembled view of an embodiment of an optical disk drive including a protective structure.
Figure 2:
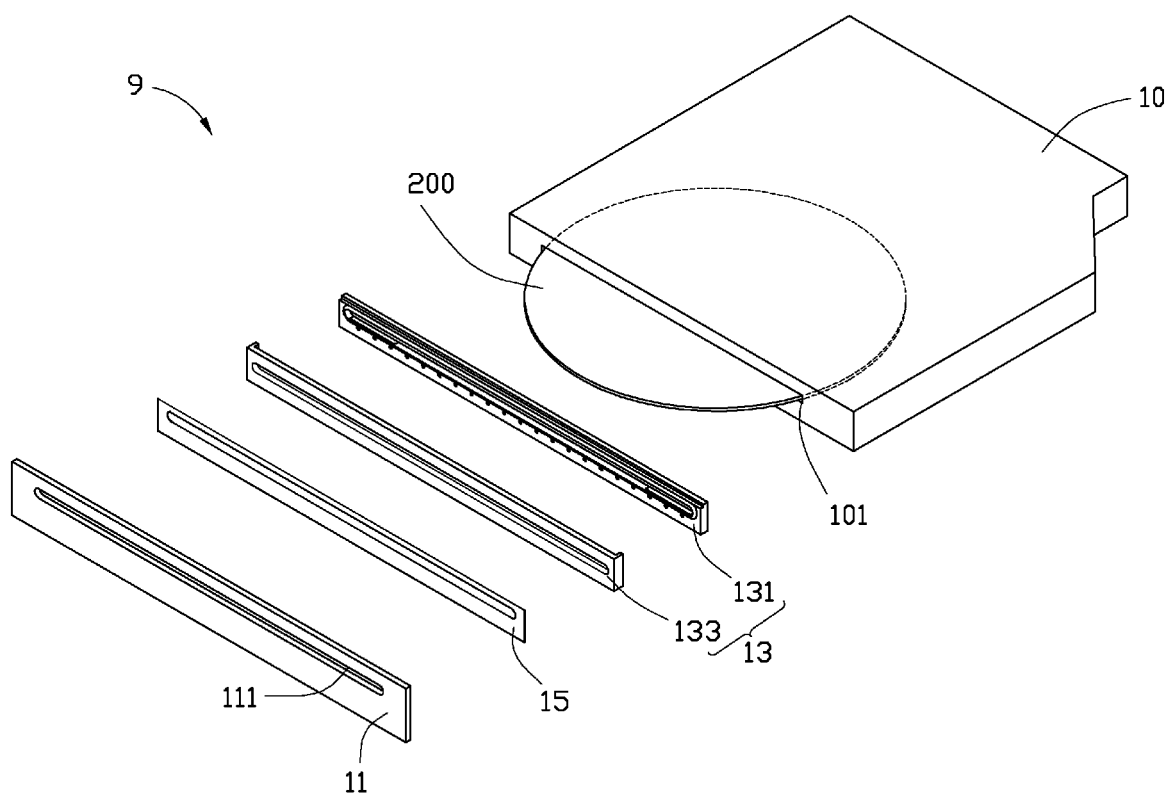
FIG. 2 is an exploded, isometric view of the optical disk drive in FIG. 1.

Referring to FIG. 1 and FIG. 2, an embodiment of an optical disk drive 9 includes a cassette mechanism 10, a housing 11, a protective structure 13, and an adhesive layer 15. The protective structure 13 is fixed to the housing 11 by the adhesive layer 15. The housing 11 is fixed to the cassette mechanism 10. The cassette mechanism 10 defines an access slot 101. The housing 11 defines a through hole 111. In the illustrated embodiment, the adhesive layer 15 is a double-sided tape.

Figure 3:
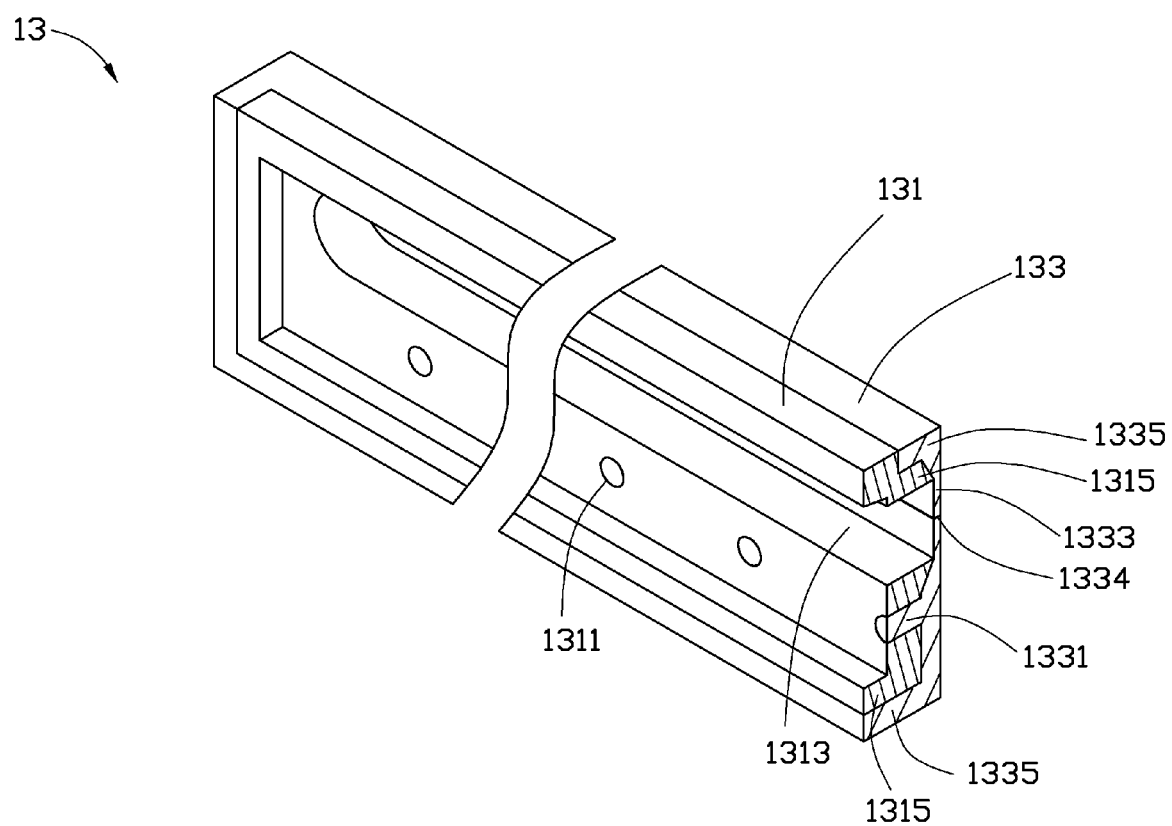
FIG. 3 is a cross-section of the protective structure employed in the optical disk drive in FIG. 1.

Referring also to FIG. 3, the protective structure 13 includes a support member 131 and a protective member 133 connected together by, for example, bi-injection molding. The support member 131 may be substantially rectangular, and defines at least one fixing hole 1311 and an assembly slot 1313. The support member 131 also includes at least one engaging portion 1315 formed on one or two ends of the support member 131. The protective member 133 may be made of elastic material, such as rubber. The protective member 133 includes a protective portion 1333, at least one protrusion 1331, and at least one coating portion 1335. In the illustrated embodiment, there are two engaging portions 1315 formed on opposite sides of the support member 131. There are also two coating portions 1335 formed on opposite sides of the protective member 133. The protective member 133 is fixed on the support member 131 with the protrusions 1331 engaging the fixing holes 1311. The protective member 133 is stably fixed on the support member 131 with the coating portions 1335 covering the engaging portions 1315. The protective portion 1333 defines a passage 1334 communicating with the assembly slot 1313. The protective portion 1333 is thin to decrease resistance from insertion of an optical disk 200 into the cassette mechanism 10. The length of the passage 1334 is not less than a diameter of the optical disk 200. A width of the passage 1334 is less than the thickness of the optical disk 200 or even substantially equal to zero to prevent contaminants from entering the cassette mechanism 10 and keep the surface of the optical disk 200 clean. In the illustrated embodiment, the fixing hole 1311 passes through opposite end surfaces of the support member 131. In the illustrated embodiment, the assembly slot 1313 is defined at a center portion of the protective member 133, and a thickness of the protective portion 1333 is less than 0.5 millimeters.

The optical disk drive 9 is assembled by fixing the protective structure 133 to the housing 11 by the adhesive layer 15. The protective structure 13 is fixed between the cassette mechanism 10 and the housing 11 as the housing 11 is fixed to the cassette mechanism 10. The through hole 111 of the housing 11, the passage 1334 of the protective member 133, the assembly slot 1313, and the access slot 101 of the cassette mechanism 10 communicate with each other.

In use, the optical disk 200 is inserted through the passage 1334, the assembly slot 1313, and the access slot 101, and is received in the through hole 111, during which the protective portion 1333 at the opposite sides of the passage 1334 is deformed to increase the width of the passage 1334, and contaminants on the surface of optical disk 200 are removed by the protective portion 1333. The protective portion 1333 at the opposite sides of the passage 1334 elastically returns to its previous state thereby decreasing the width of the passage 1334 as the optical disk 200 passes through the passage 1334.

The optical disk drive prevents contaminants from entry, as well as removing contaminants from the surface of the optical disk by the protective member.

It can be understood that the width of the passage may be substantially equal to the thickness of the optical disk, as long as the protective portion prevents contaminants from entry. If the protective portion is sufficiently thin, the protective member can be made from a stiffer material. Furthermore, to completely prevent contaminants from entry, the protective portion at opposite sides of the passage may also overlap to close the passage. The optical disk can push the protective portion away from the main body, through the passage, the assembly slot, and the access slot, to be received in the through hole.

Further, only one side of the passage of the protective portion may be deformable.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

The invention claimed is:

1. An optical disk drive, comprising:
    a cassette mechanism defining an access slot;
    a housing fixed to the cassette mechanism, the housing defining a through hole aligning with the access slot; and
    a protective structure fixed between the cassette mechanism and the housing, the protective structure comprising a support member fixed to the cassette mechanism, and a protective member connected to the support member, the support member defining an assembly slot communicating with the access slot of the cassette, and comprising two coating portions extending from opposite ends of the protective member; the protective member comprising a protective portion having a passage defined therein, and two engaging portions formed on opposite sides of the support member; wherein the protective member is stably fixed on the support member with the coating portions covering the engaging portions, the protective portion is elastically deformable to increase a width of the passage, and elastically returns the width of the passage to its original width; the access slot, the assembly slot, the passage and the through hole communicate with each other.

2. The optical disk drive of claim 1, wherein the thickness of the protective portion is less than 0.5 millimeters (mm).

3. The optical disk drive of claim 1 further comprising double-sided tape, wherein the protective member of the protective structure is fixed to the housing by the double-sided tape.

4. The optical disk drive of claim 1, wherein the protective member and the support member are connected together by bi-injection molding.

5. The optical disk drive of claim 4, wherein the support member defines at least one fixing hole; the protective member further comprises at least one protrusion; the protective member is fixed to the support member with the at least one protrusion correspondingly engaging with the at least one fixing hole.

6. An optical disk drive, comprising:
a cassette mechanism defining an access slot;
a housing fixed to the cassette mechanism, the housing defining a through hole aligning with the access slot; and
a protective structure fixed between the cassette mechanism and the housing, the protective structure comprising a support member fixed to the cassette mechanism, and a protective member connected to the support member, the support member defining an assembly slot communicating with the access slot of the cassette, and comprising two coating portions extending from opposite ends of the protective member; the protective member comprising two protective portions having a passage defined therein, and two engaging portions formed on opposite sides of the support member; wherein the protective member is stably fixed on the support member with the coating portions covering the engaging portions, a width of the passage is less than a width of an optical disk; the access slot, the assembly slot, the passage and the through hole communicate with each other.

7. The optical disk drive of claim 6, wherein the protective portions are positioned at opposite sides of the passage and overlap to close the passage.

8. The optical disk drive of claim 6, wherein the thickness of the protective portions are less than 0.5 mm.

9. The optical disk drive of claim 6, further comprising double-sided tape, wherein the protective member of the protective structure is fixed to the housing by the double-sided tape.

10. The optical disk drive of claim 6, wherein the protective member and the support member are connected by bi-injection molding.

11. The optical disk drive of claim 10, wherein the support member defines at least one fixing hole; the protective member further comprises at least one protrusion; the protective member is fixed to the support member with the at least one protrusion correspondingly engaging with the at least one fixing hole.

* * * * *